Feb. 26, 1929.
M. A. WATSON
1,703,217
MEAT SKINNING MACHINE
Filed Feb. 3, 1927     4 Sheets-Sheet 1
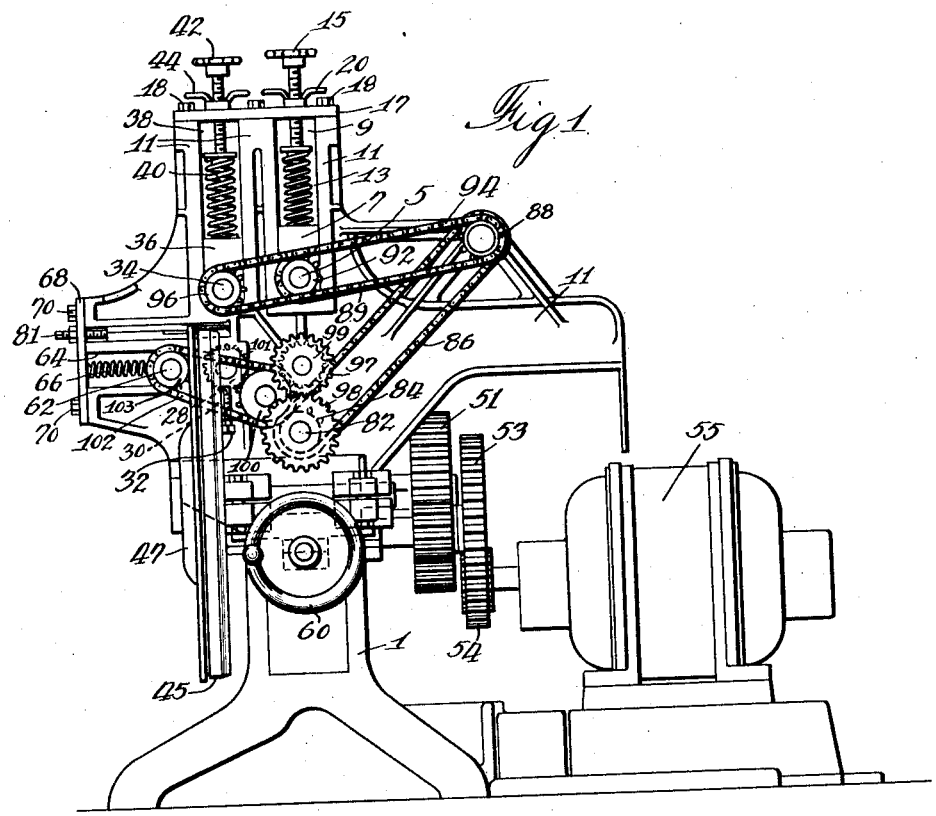
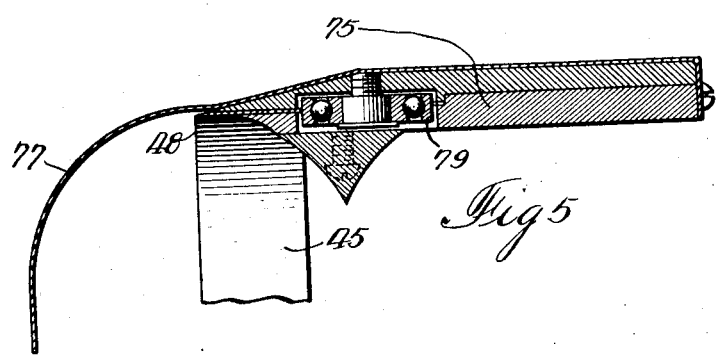
Inventor:
Martin A. Watson.
By Rummler & Rummler
Attys.

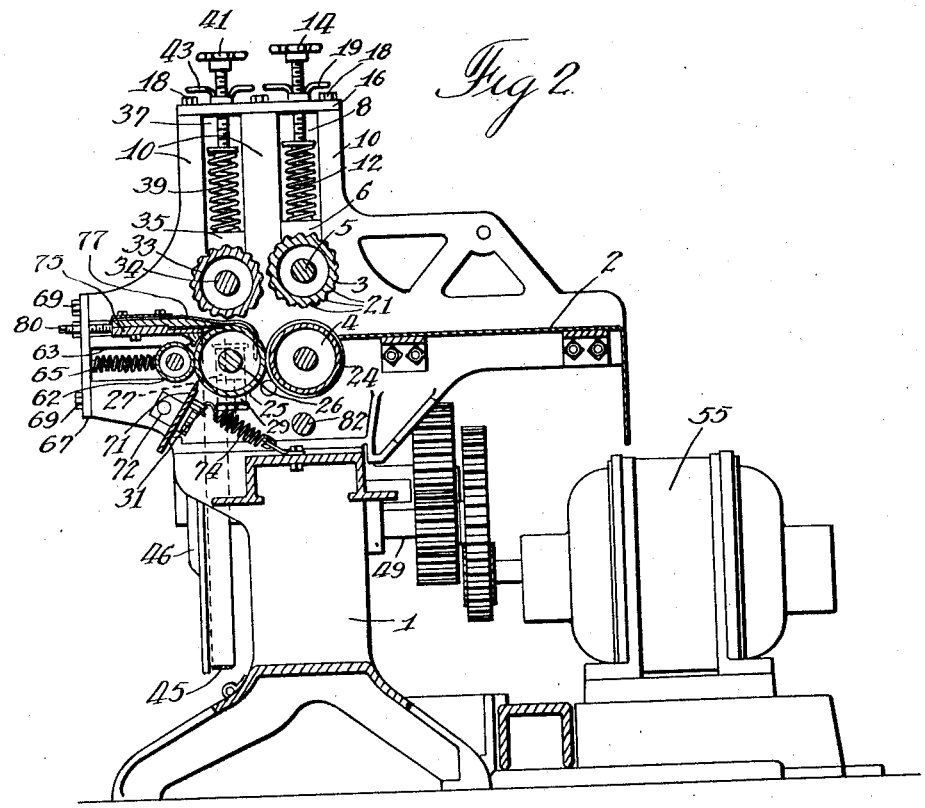
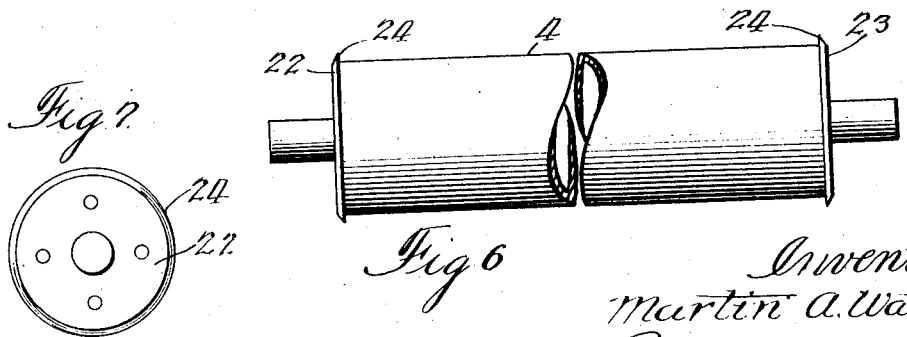

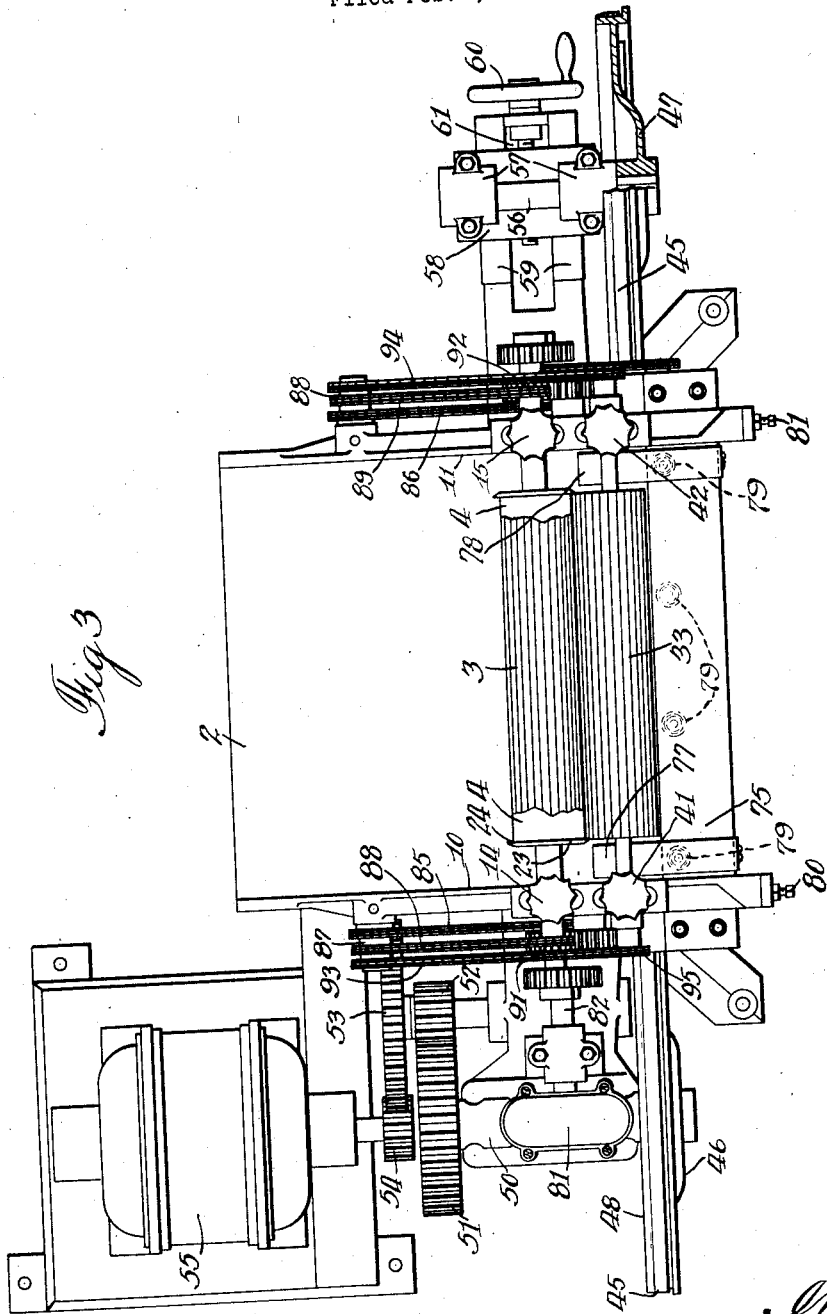

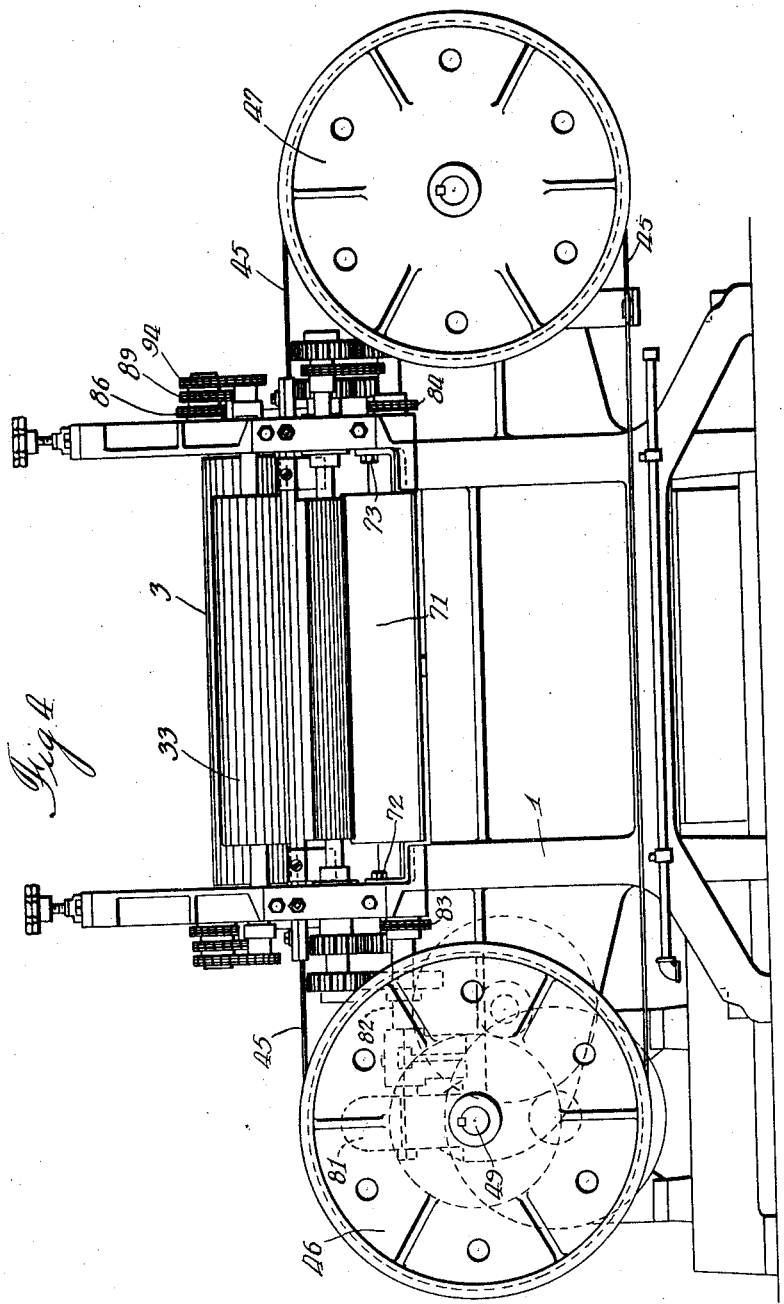

Patented Feb. 26, 1929.

1,703,217

UNITED STATES PATENT OFFICE.

MARTIN ANDREW WATSON, OF CHICAGO, ILLINOIS, ASSIGNOR TO SWIFT & COMPANY, OF CHICAGO, ILLINOIS, A CORPORATION OF ILLINOIS.

MEAT-SKINNING MACHINE.

Application filed February 3, 1927. Serial No. 165,607.

This invention relates to machines for removing the skin from slabs of meat, such as sides of bacon.

The main objects of this invention are to provide an improved meat-skinning machine of this character which is provided with a knife movable transversely to the direction of the path of the meat slabs so as to secure a slicing action of the knife when severing the skin from the slabs of meat; to provide improved means for ironing and stretching out the wrinkles from the meat slabs before feeding them to the skinning knife; to provide improved feeding means whereby the slabs of meat are pushed against the cutting edge of the skinning knife as distinguished from former machines where the slabs of meat were pulled against the knife by fingers which engaged the edges of the skin of the meat slabs; and to provide improved means for mounting the movable knife.

An illustrative embodiment of this invention is shown in the accompanying drawings, in which:—

Fig. 1 is an end elevation showing the drive connections for the feed rollers.

Fig. 2 is an elevation, partly in section, of the same.

Fig. 3 is a top plan view with one of the band knife carrying wheels partly in section, and parts of the top front roller broken away to show the brisket knives on the lower roller.

Fig. 4 is a side elevation taken from the back or discharge side of the machine.

Fig. 5 is an enlarged sectional detail of the guard for passing the briskets over the knife.

Fig. 6 is an elevation of the lower front roller which carries the brisket knives.

Fig. 7 is an enlarged plan view of one of the brisket knives.

In the construction shown in the drawings a supporting frame 1 is provided with a feed table 2 which is adapted to receive the slabs of meat thereon preparatory to being fed into the skinning machine. Coacting upper and lower rollers 3 and 4 respectively are journalled on the supporting frame 1 in a position to receive the slabs of meat therebetween. The ends of shaft 5 of the upper roller 3 are journalled in boxings 6 and 7 which are arranged to slide in slots 8 and 9 respectively of the upwardly extending side frames 10 and 11 respectively of supporting frame 1, against the action of compression springs 12 and 13 respectively whose tension can be varied by hand screws 14 and 15 respectively threaded in plates 16 and 17 respectively which are secured to the tops of the side frames by suitable means such as cap screws 18. Wing nuts 19 and 20 are provided on the hand screws 14 and 15 respectively for locking the screws against rotation.

The upper roller 3 is preferably made of aluminum and is provided with grooves or corrugations 21 in the surface thereof for gripping and feeding slabs of meat. The lower roller 4 is of shorter length than its coacting roller 3 and has cutting discs or brisket knives 22 and 23 mounted coaxially one on each end thereof, these discs being of slightly larger diameter than the roller 4 so that their cutting edges extend slightly beyond the surface of the roller as shown at 24 in Figure 6.

A second set of coacting rollers is provided for receiving the meat slabs from the first set of rollers and comprises a lower roller 25 having the ends of its shaft 26 journalled in boxings 27 and 28 which are slidably mounted in slots 29 and 30 respectively in outside frames 10 and 11 respectively. The roller 25 is adjustable in a vertical direction by means of set screws 31 and 32 threaded in the side frames 10 and 11 respectively, the ends of these set screws bearing against and supporting their respective boxes. The other roller of this second set, shown at 33, has the ends of its shaft 34 journalled in boxings 35 and 36 which are slidable in slots 37 and 38 of side frames 10 and 11 respectively against the action of compression springs 39 and 40, whose tension can be varied and set by the end screws 41 and 42 respectively carrying lock nuts 43 and 44 respectively, in the same manner as the other top roller 3. The roller 33 is preferably of the same construction as roller 3 except that the grooves therein are shallower and its length is the same as the lower front roller 4, as shown in Figures 3 and 4.

The skinning knife for this machine is in the form of an endless band 45 carried on wheels 46 and 47 and positioned so that its cutting edge 48 extends along the surface of roller 25 in close proximity thereto.

The band wheel 46 is keyed on one end of a shaft 49 which is suitably journalled on the supporting frame 1 by bearings 50 and a driving gear 51 is keyed on the other end thereof. Gear 51 is driven through reduction gears 52, 53 and 54 by a motor 55.

The band wheel 47 is an idler and is keyed to a shaft 56 journalled in boxings 57 of a carriage 58 which is slidably mounted on guideways 59 on the supporting frame 1. A hand wheel 60 having a screw 61 threaded into the carriage 58 is provided for moving the carriage on its runways so as to secure proper tension of the band knife 45.

Located in close proximity to the lower rear roller 25 is a roller 62 of relatively small size, journalled in boxings slidably mounted in slots 63 and 64 of side frames 10 and 11, respectively. The roller 62 is urged into yielding contact with the roller 25 by compression springs 65 and 66 which bear against plates 67 and 68, respectively, secured to the side frames by cap screws 69 and 70, respectively. When the skin is severed from the meat slabs it is received between the rollers 62 and 25, carried downwardly and then deflected outwardly from the roller 25 by a scraper 71 pivoted at 72 and 73 to the side frames 10 and 11, respectively, and which is held yieldingly against the roller 25 by a tension spring 74.

A plate 75 is provided in the rear of the machine at close proximity to lower rear roller 25, this plate carrying the slab of meat from which the skin has been removed after same has passed through the second set of co-acting rollers. Attached to the ends of this plate are knife guards 77 and 78. These guards have a downward curved portion as shown in Fig. 5 and are placed so as to carry the brisket portion of the meat slab over the knife 45 without coming in contact therewith.

At four points in this plate are mounted radial ball bearings 79 in such position that the back edge of knife 45 bears thereagainst.

Adjustability of this plate together with the bearings, with relation to knife 45, is secured by means of set screws 80 and 81 threaded in plates 67 and 68, the inner ends of the set screws bearing against the end portion of plate 75.

A drive for the rollers is secured through a worm and gear 81, shaft 82, sprocket wheels 83 and 84 carried therein, chains 85 and 86, respectively, which drive triple sprocket idler wheels 87 and 88, respectively, journalled on the side frames 10 and 11, respectively. The triple sprockets 87 and 88 in turn carry chains 89 and 90, respectively, which drive sprockets 91 and 92, respectively, on the ends of the shaft 5 for rotating the upper front roller 3. The upper rear roller 33 is driven by chains 93 and 94 which connect the sprockets 87 and 88 with sprockets 95 and 96, respectively, on the ends of shaft 34.

Lower front roller 4 is driven by gear 97 keyed thereto engaging a gear 98 on shaft 82. A gear 99 mounted coaxially with gear 97 drives the idler 100 which engages and drives a gear 101 on the lower rear roller 25 and carries a chain 102 which drives a sprocket 103 on roller 62.

In operation of the device the slabs of meat are placed on the receiving table 2, skin side down, with the long edge of the slab parallel to the axis of the rollers of the skinning machine. The portion at the ends of these slabs called the brisket is not to be skinned. The slabs are fed into the machine so that the skin on the brisket portion is cut from the remainder of the slab by the brisket knives which are mounted on the ends of the lower front roller 4. Knives are provided on each end of this roller so as to accommodate right and left hand slabs of meat. The first set of coacting rollers iron the wrinkles out of the slab and pass it on to the second set of coacting rollers 33 and 25, smoothing out the skin and at the same time holding it firmly as it passes into engagement with the band knife 45. The rollers 25 and 62 travel faster than the other rollers of the machine so that the severed skin when caught therebetween is stretched and helps pull the side of meat through the machine. The lower rear roller is adjusted with respect to the knife so that the proper clearance is secured for removing the skin from the slab of meat by means of set screws 31 and 32. The severed edge of the skin is engaged between the rollers 25 and 62 which help to pull the slab of meat against the knife 45, and the scraper 71 then removes the skin from the roller 25 and discharges it into a suitable receptacle. The brisket portions, skin on which has not been cut loose from the rest of the slab, are conducted over the knife so as not to come in contact therewith by one of the guards 75 or 76, depending on it being a right or left side of meat, the upper roller 33 being of the same length as the lower front roller 4 and in consequence thereof does not bear down upon the said brisket portion as it passes over the knife.

Proper tension of the band knife 45 is secured by hand wheel 60, the screw 61 of which engages the carriage 58 which carries shaft 56 to which the band wheel 47 is keyed. The annular ball bearings 79 bear against the back edge of the knife 45 at four points along the length of plate 75, holding the knife steadily in position to sever the skin from the slabs of meat, and by reason of the traveling movement of knife 45 a slicing action is secured which is very desirable.

Proper pressure on the slabs of meat by the upper corrugated rollers is secured by their respective hand wheels 14, 15, 41 and 42, pressing down on their respective compression springs which in turn bear on their sliding boxings.

Although but one specific embodiment of this invention has been herein shown and described, it will be understood that numerous details of the construction shown may be altered or omitted without departing from the spirit of this invention as defined by the following claims.

I claim:

1. A skinning machine of the class described, comprising a supporting frame, a knife mounted on said frame, means for moving said knife in a lengthwise direction, means for pushing slabs of meat into engagement with said knife for severing skin therefrom, and means for engaging such severed skin to pull said slabs of meat through said machine at a faster rate than fed by said pushing means.

2. A skinning machine of the class described, comprising a supporting frame, a knife mounted on said frame, means for moving said knife in a lengthwise direction, upper and lower coacting feed rollers journalled on said frame for engaging and moving slabs of meat into engagement with said knife for severing skin therefrom, and a disc brisket knife on one of said rollers for cutting the skin on a slab of meat as it passes thereover prior to engagement with said skin severing knife.

3. A skinning machine of the class described, comprising a supporting frame, a knife mounted on said frame, means for moving said knife in a lengthwise direction, upper and lower coacting feed rollers journalled on said frame, one of said rollers being of shorter length than the other, and a disc brisket knife mounted coaxially on each end of said short roller for cutting the skin on a slab of meat as it passes thereover prior to engagement with said skin severing knife, said rollers being adapted to move slabs of meat into engagement with said knife for severing skin therefrom.

4. A skinning machine of the class described, comprising a supporting frame, a lower roller and an upper roller journalled on said frame coacting to receive slabs of meat therebetween for ironing out the wrinkles therefrom, a second lower roller and upper roller journalled on said frame coacting to receive the meat slabs discharged from said wrinkle ironing rollers, a knife movably mounted on said frame adjacent said second lower roller, and means for moving said knife in a direction transversely to the direction of movement of said meat slabs for giving a slicing action thereto.

5. A skinning machine of the class described, comprising a supporting frame, a lower roller and an upper roller journalled on said frame coacting to receive slabs of meat therebetween for ironing out the wrinkles therefrom, a second lower roller and upper roller journalled on said frame coacting to receive the meat slabs discharged from said wrinkle ironing rollers, a knife movably mounted on said frame adjacent said second lower roller, means for moving said knife in a direction transversely to the direction of movement of said meat slabs for giving a slicing action thereto, a roller journalled on said frame adjacent said second lower roller, and resilient means for yieldingly pressing said last mentioned roller against said second lower roller for engaging skin severed from said meat slabs.

6. A skinning machine of the class described, comprising a supporting frame, a knife mounted on said frame, means for moving said knife in a lengthwise direction, upper and lower coacting feed rollers journalled on said frame for engaging and moving slabs of meat into engagement with said knife for severing skin therefrom, and means for adjusting said lower roller relative to said knife for varying the thickness of cut made by said knife.

7. A skinning machine of the class described, comprising a supporting frame, upper and lower feed rollers journalled on said frame, one of said rollers being of shorter length than the other, a disc brisket knife mounted coaxially on each end of said short roller, a skinning knife mounted on said frame, means for moving said knife in a lengthwise direction, and a guard over said skinning knife adjacent each of said brisket knives for the purpose set forth.

Signed at Chicago this fourth day of January, 1927.

MARTIN ANDREW WATSON.